United States Patent
Nash et al.

(10) Patent No.: US 10,957,085 B2
(45) Date of Patent: Mar. 23, 2021

(54) METHODS AND SYSTEMS FOR ADDING CONTENT TO IMAGES BASED ON NEGATIVE SPACE RECOGNITION

(71) Applicant: INTERNATIONAL BUSINESS MACHINES CORPORATION, Armonk, NY (US)

(72) Inventors: Julia Nash, Richardson, TX (US); Osakpamwan Osaigbovo, Argyle, TX (US); Sumit Patel, Scottsdale, AZ (US); Chandra Shekhar, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/541,761

(22) Filed: Aug. 15, 2019

(65) Prior Publication Data
US 2021/0049800 A1 Feb. 18, 2021

(51) Int. Cl.
| | |
|---|---|
| G06T 11/60 | (2006.01) |
| G06T 7/90 | (2017.01) |
| G06T 7/11 | (2017.01) |
| G06T 7/00 | (2017.01) |
| G06T 5/00 | (2006.01) |

(52) U.S. Cl.
CPC ............. *G06T 11/60* (2013.01); *G06T 5/007* (2013.01); *G06T 7/11* (2017.01); *G06T 7/90* (2017.01); *G06T 7/97* (2017.01); *G06T 2207/10016* (2013.01); *G06T 2207/10024* (2013.01)

(58) Field of Classification Search
CPC ........................................................ G06T 11/60
See application file for complete search history.

(56) References Cited

U.S. PATENT DOCUMENTS

| | | | |
|---|---|---|---|
| 7,106,381 B2 | 9/2006 | Molaro | |
| 8,595,761 B2 | 11/2013 | Amsterdam et al. | |
| 10,068,179 B2 | 9/2018 | O'Donovan | |
| 2008/0111882 A1* | 5/2008 | Tsai | H04N 5/44504 |
| | | | 348/115 |
| 2010/0289948 A1 | 11/2010 | Molaro et al. | |
| 2010/0312608 A1* | 12/2010 | Shan | G06Q 30/0255 |
| | | | 705/14.54 |
| 2012/0072957 A1 | 3/2012 | Cherukuwada et al. | |

(Continued)

FOREIGN PATENT DOCUMENTS

| | | |
|---|---|---|
| CN | 107347166 A | 11/2017 |
| CN | 109740585 A | 5/2019 |
| WO | 2012019163 A3 | 5/2012 |

OTHER PUBLICATIONS

"Optimizing Text Placement and Color Scheme for Video," IP.com, IPCOM000221949D, Sep. 17, 2012, 2 pages.

*Primary Examiner* — Jitesh Patel
(74) *Attorney, Agent, or Firm* — Griffiths & Seaton PLLC

(57) ABSTRACT

Embodiments for adding content to images are provided. A plurality of images are received. Each of the plurality of images includes a plurality of image portions. A negative space score is calculated for each of the plurality of image portions. At least some of the plurality of image portions are selected to display content based on the calculated negative space scores. The plurality of images are caused to be rendered with the content displayed over the selected at least some of the plurality of image portions.

21 Claims, 11 Drawing Sheets

(56) References Cited

U.S. PATENT DOCUMENTS

2013/0053005 A1    8/2013  Ramer
2015/0078733 A1\*  3/2015  Popkiewicz ......... H04N 9/8205
                                                            386/278
2015/0186341 A1    7/2015  Redol et al.

\* cited by examiner

METHODS AND SYSTEMS FOR ADDING CONTENT TO IMAGES BASED ON NEGATIVE SPACE RECOGNITION

BACKGROUND OF THE INVENTION

Field of the Invention

The present invention relates in general to computing systems, and more particularly, to various embodiments for adding content to images based on negative space recognition.

Description of the Related Art

Various types of images are often rendered in such a way to display content other than what is shown in the images themselves. For example, videos (e.g., television broadcasts, movies, etc.) are sometimes presented with "captions" or "closed captioning" that includes text-based versions of sounds associated with the videos (e.g., dialogue, descriptions of sound effects, names of songs, etc.) and/or other content, such as advertisements, logos, etc. In some instances, this content obscures portions of the image(s) that the viewer would like to see (e.g., statistics related to a professional athlete or team when viewing a sporting event).

Current solutions to this issue include, for example, disabling the displaying of the content and/or customizing the manner in which the content is displayed. However, current methods for customizing the displaying of the content do not provide a flexible, dynamic solution that adapts to particular scenarios (e.g., the types, sizes, locations, etc. of subjects in the images) and generally results in the content being shown in a relatively stationary manner. As a result, the "important" or "desired" portions of the images are still often obscured from view.

SUMMARY OF THE INVENTION

Various embodiments for adding content to images, by a processor, are provided. A plurality of images are received. Each of the plurality of images includes a plurality of image portions. A negative space score is calculated for each of the plurality of image portions. At least some of the plurality of image portions are selected to display content based on the calculated negative space scores. The plurality of images are caused to be rendered with the content displayed over the selected at least some of the plurality of image portions.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
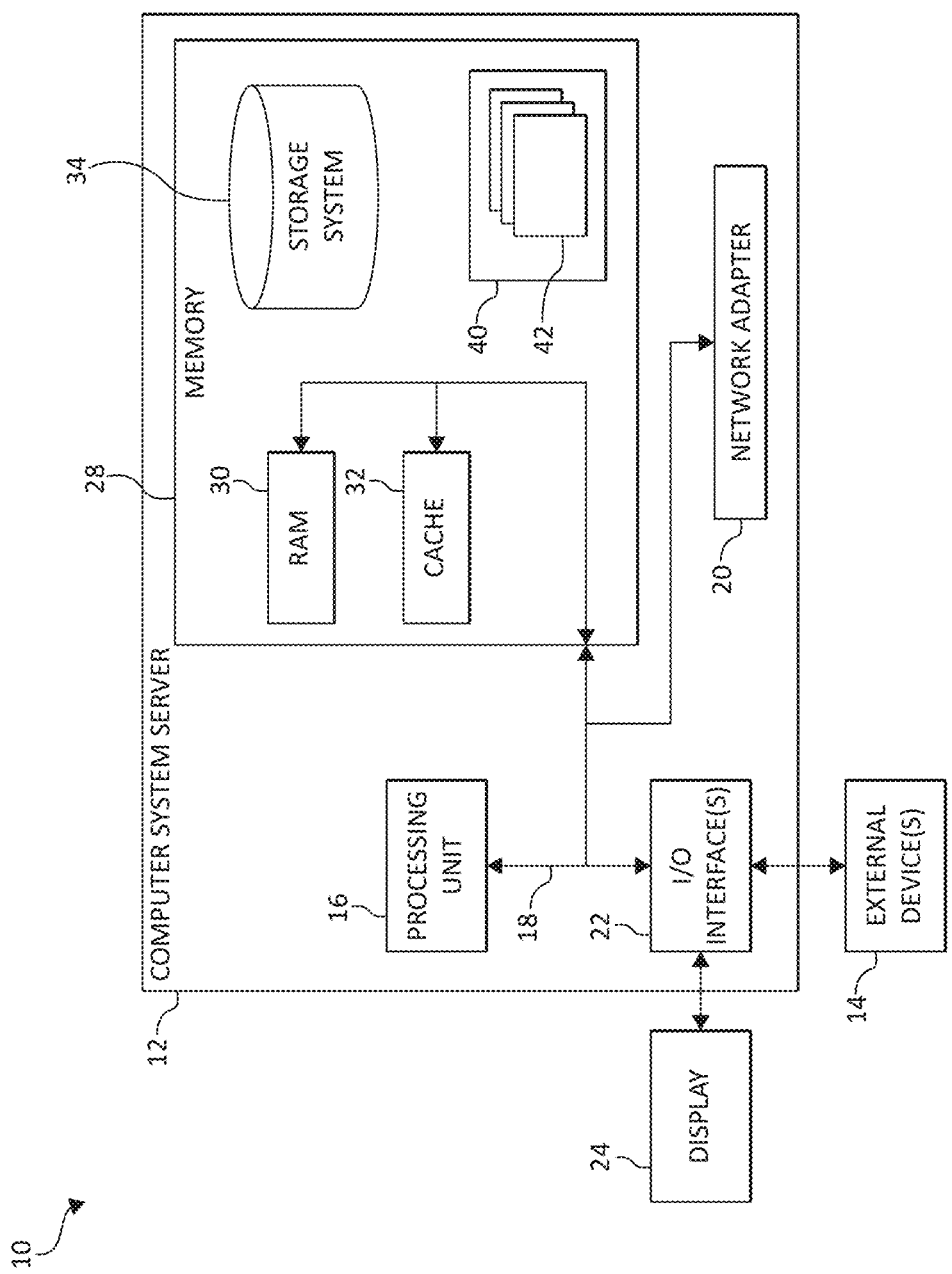
FIG. 1 is a block diagram depicting an exemplary computing node according to an embodiment of the present invention.

As discussed above, various types of images are often rendered in such a way to display content other than what is shown in the images themselves. For example, videos (e.g., television broadcasts, movies, etc.) are sometimes presented with "captions" or "closed captioning" that includes text-based versions of sounds associated with the videos (e.g., dialogue, descriptions of sound effects, names of songs, etc.) and/or other content, such as advertisements, logos, etc. In some instances, this content is displayed in such a way that it obscures portions of the image(s) that the viewer would like to see.

For example, consider a scenario in which a viewer is watching (or viewing, consuming, etc.) a television broadcast of a live event, such as an awards show or a sporting event. If the broadcast is being provided with closed captioning (e.g., perhaps as an optional feature enabled by the user), various types of information that are displayed as part of the broadcast, such as other awards a nominee has won or statistics related to a particular athlete or team, may be (at least partially) obscured (or "blocked") by the addition of the closed captioning to the images (or video frames).

Similarly, when the viewer is watching a movie, even if this "extra" content (e.g., captioning or advertisements) is shown near an edge of the image(s), it may obscure portions of the image that are considered to be "important." For example, the content creator may intentionally show an important detail in such a way that it is not centered in the frame.

Current solutions to this issue include, for example, disabling the content and/or customizing the manner in which the content is displayed. However, current methods for customizing the displaying of the content do not provide a flexible, dynamic solution that adapts to particular scenarios (e.g., the types, sizes, locations, etc. of subjects in the images) and generally results in the content being shown in a relatively stationary manner. As a result, the important or desired portions of the images are still often obscured from view.

To address these needs and/or the shortcomings in the prior art, in some embodiments described herein, methods and/or systems are disclosed that, for example, analyze images to be rendered (e.g., footage, videos, etc.), and when the images are rendered, display content (e.g., captions, advertisements, etc.) in such a way to optimize the viewing experience for the user (e.g., to minimize the extent to which important/desirable portions of the images are obscured). In some embodiments, this process is performed automatically, in a dynamic manner such that the viewing is optimized regardless of the image(s) being rendered.

In some embodiments, this process is performed by analyzing the received (and/or "to be rendered") image(s) with respect to "negative space." As will be appreciated by one skilled in the art, negative space may be considered to be relatively "empty" space (or portions of an image) around the subject(s) of the image, such as the background or other part(s) of the image which the primary subject(s) do not occupy (i.e., the "unimportant" portion(s) of the image). For example, if an image shows an individual (e.g., regardless of their position in the image) with a blue sky or patterned wallpaper behind/surrounding the individual, the portion(s) of the image that show the sky or wallpaper may be considered to be negative space. In contrast, "positive space" may be considered to by the portion(s) of the image that are occupied by the subjects (e.g., the individual(s)), even if they are not necessarily centered in the image (i.e., the "important" portion(s) of the image).

For example, in some embodiments, a series of images (or at least one image), such as a video (or video clip) that includes multiple video frames, is received (or retrieved, detected, etc.), perhaps before being rendered (e.g., shown on a display, such as a television, computing device display screen, etc.). The system divides each of the images into smaller portions that are then processed (e.g., via visual recognition or computer vision software and/or a cognitive analysis) to determine which of the portions are (or include) negative space and which of the portions are positive space (e.g., the system classifies each of the portions as either negative space or positive space). For example, the system may calculate a negative space score (or negative space confidence score) for each of the portions.

The system then selects one or more of the portions (e.g., based on the calculated scores) of the image(s) to display "additional" content (e.g., captions, advertisements, etc.). The image(s) are then rendered (or caused to be rendered) on a suitable display device with the content being displaying in (or on, over, etc.) the selected portion(s) of the image(s). The result may be that the content is displayed on/over the image(s) in such a way that its position (and/or size, shape, etc.) is not static but flexible and dynamic as the images are being consumed (or viewed) by the user(s) (or viewer(s)), and the viewing experience of the user is maximized or optimized.

In some embodiments, additional features are implemented to further enhance the user's viewing experience. For example, because of the different images rendered, the basic method described above may result in the content (e.g., captions) "jumping" or "darting" around the images (or display screen) during rendering. That is, when utilized with a video, under some circumstances (e.g., when there are significant changes between one video frame to the next), the content may appear to move a relatively large distance across the screen very quickly. Such an effect may make it difficult or frustrating for the user to "follow" the content. To account for this, in some embodiments, the system imposes a "limit" with respect to how far the content can appear to move between successive images (e.g., video frames).

Additionally, in some embodiments, the manner in which the content is rendered is adjusted or tuned based on, for example, the color tones, brightness, etc. of the images (or portions of the images) over which the content is displayed to further enhance the viewing experience. This feature may prevent, as one example, black captioning being displayed over dark portions of the image(s) (e.g., the color and/or brightness of the captioning may be adjusted to it is visible against the dark portions of the image(s)). Also, a similar functionality may be implemented that allows content (e.g., advertisements, logos, watermarks, etc.) to be "blended" with the selected portions of the images. For example, if the content includes a logo, the color of a portion of the logo may be adjusted to "blend in" with the selected portions of the images (e.g., so that the logo is still visible but not overly distracting). Such features may be implemented by analyzing the portions of the images (and/or the content) using computing vision techniques and/or a cognitive analysis.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, adding content to images. Utilizing the models, the performance (or operation) of the system (e.g., utilizing/based on new inputs) may be predicted and/or the performance of the system may be optimized by investigating how changes in the input(s) effect the output(s). Feedback received from (or provided by) users and/or administrators may also be utilized, which may allow for the performance of the system to further improve with continued use.

The processes described herein may utilize various information or data sources associated with users (e.g., users who provide search queries) and/or the content (e.g., the document(s), image(s)). With respect to users, the data sources may include, for example, any available data sources associated with the user. For example, in some embodiments, a profile (e.g., a cognitive profile) for the user(s) may be generated. Data sources that may be use used to generate a cognitive profile for the user(s) may include any appropriate data sources associated with the user that are accessible by the system (perhaps with the permission or authorization of the user). Examples of such data sources include, but are not limited to, communication sessions and/or the content (or communications) thereof (e.g., phone calls, video calls, text messaging, emails, in person/face-to-face conversations, etc.), a profile of (or basic information about) the user (e.g., medical history, job title, place of work, length of time at current position, family role, etc.), a schedule or calendar (i.e., the items listed thereon, time frames, etc.), projects (e.g., past, current, or future work-related projects), location (e.g., previous and/or current location and/or location relative to other users), social media activity (e.g., posts, reactions, comments, groups, etc.), browsing history (e.g., web pages visited), and online purchases. As a particular example, a user's medical history (e.g., with respect to eyesight/vision) may be utilized to adjust/tune the color/brightness and/or size of displayed content.

It should be understood that as used herein, the term "computing node" (or simply "node") may refer to a computing device, such as a mobile electronic device or a desktop computer, and/or an application, such a chatbot, an email application, a social media application, a web browser, etc. In other words, as used herein, examples of computing nodes include, for example, computing devices such as mobile phones, tablet devices, desktop computers, or other devices, such as appliances (IoT appliances) that are owned and/or otherwise associated with individuals (or users), and/or various applications that are utilized by the individuals on such computing devices.

In particular, in some embodiments, a method for adding content to images, by a processor, is provided. A plurality of images are received. Each of the plurality of images includes a plurality of image portions. A negative space score is calculated for each of the plurality of image portions. At least some of the plurality of image portions are selected to display content based on the calculated negative space scores. The plurality of images are caused to be rendered with the content displayed over the selected at least some of the plurality of image portions.

The plurality of images may include a plurality of video frames. The causing of the plurality of images to be rendered may include causing a first of the plurality of images to be rendered with the content displayed over a first of the plurality of image portions, and after the rendering of the first of the plurality of images, causing a second of the plurality of images to be rendered with the content displayed over a second of the plurality of image portions. A distance between a position of the content on the first of the plurality of images and a position of the content on the second of the plurality of images may be limited.

The content may include at least one of captions associated with the plurality of images and an advertisement associated with the plurality of images. The calculating of the negative space score for each of the plurality of image portions may be performed utilizing a cognitive analysis.

A color tone of the selected at least some of the plurality of image portions (and/or the content) may be analyzed. At least one of a brightness and a color of the content may be adjusted based on the analyzing of the color tone of the selected at least some of the plurality of image portions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
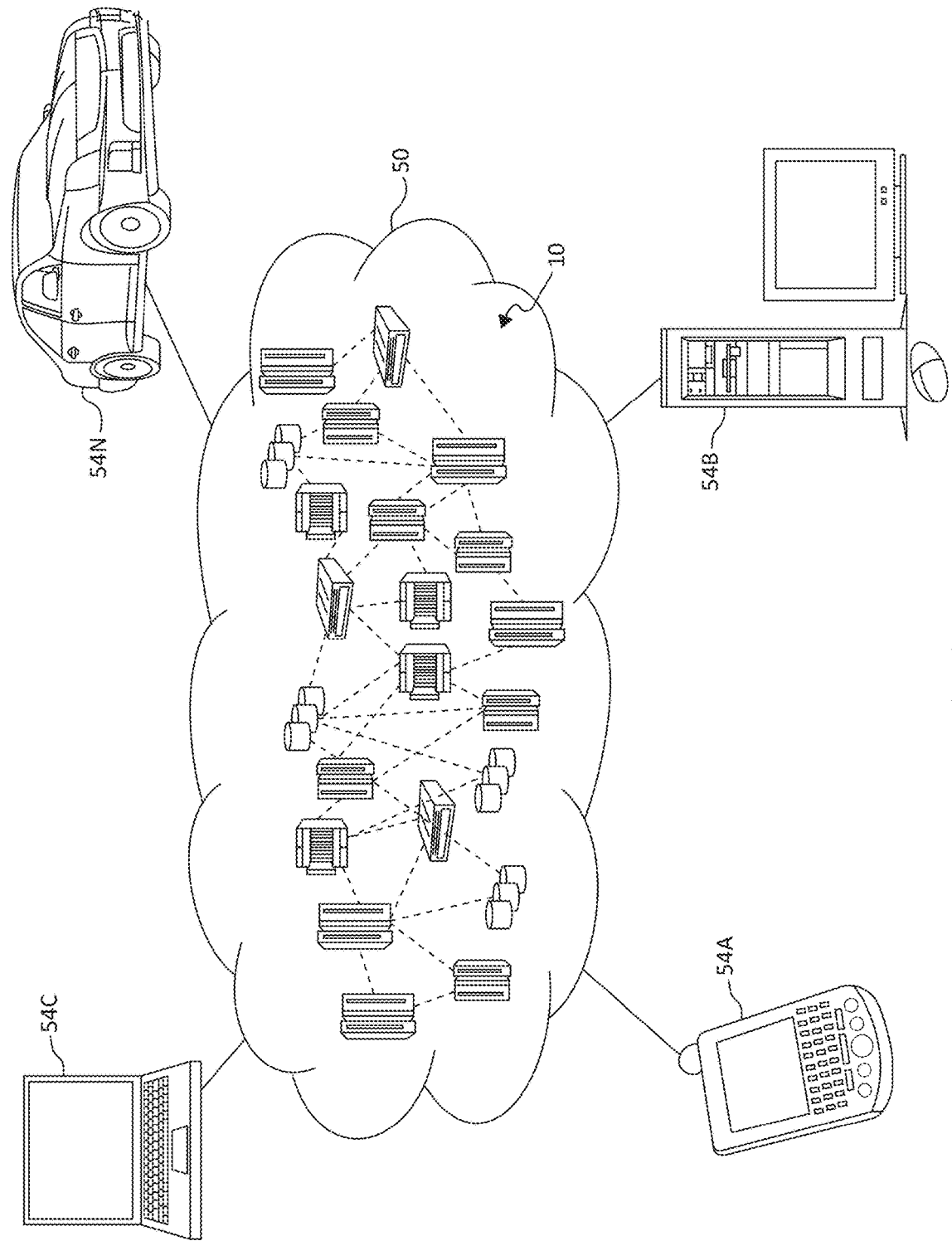
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
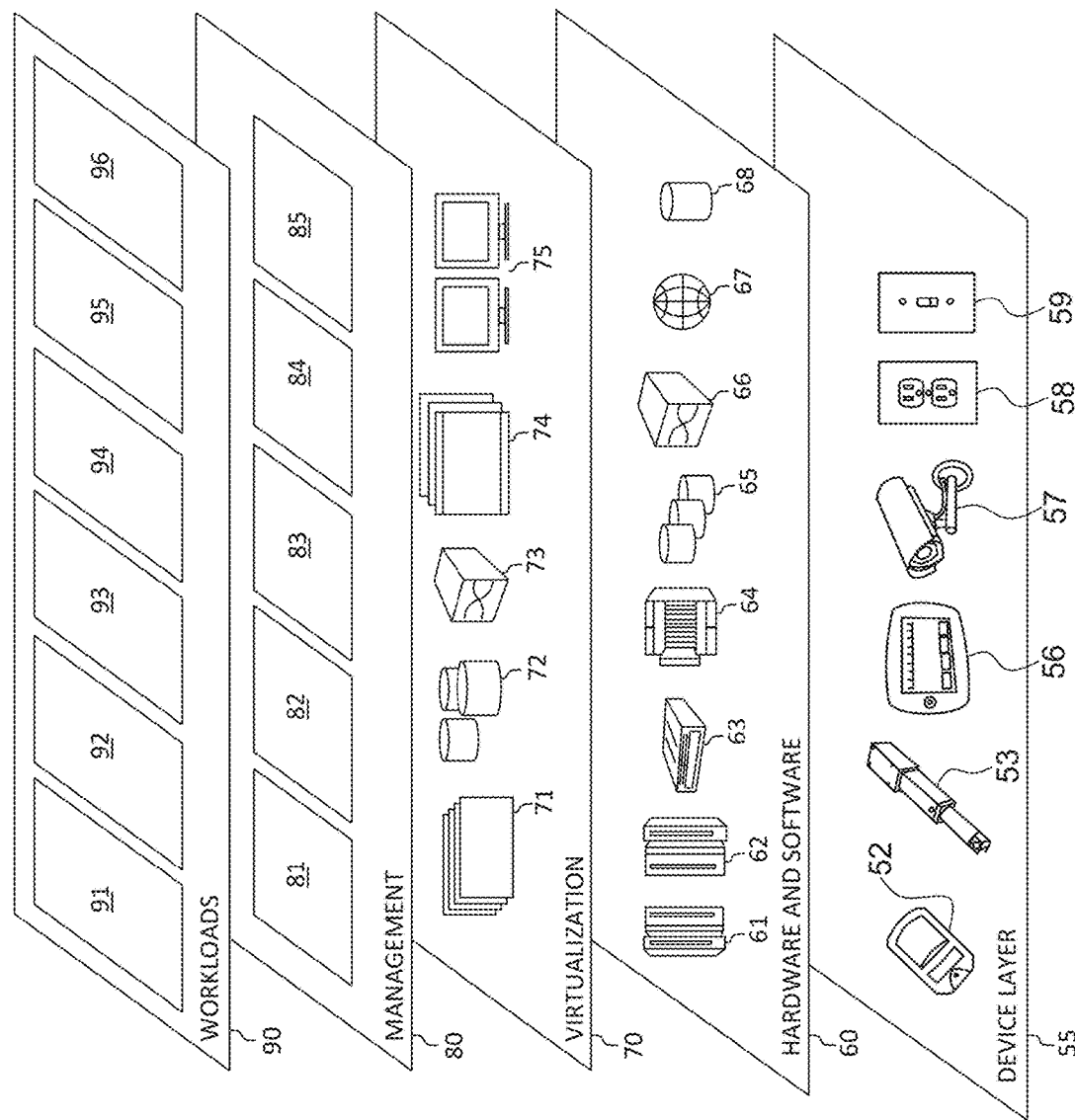
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for adding content to images, as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, methods and/or systems for adding content to images are provided. In some embodiments, the system analyzes images (or at least one image) to be rendered (e.g., footage, videos, etc.), and when the images are rendered, displays content (e.g., captions, advertisements, etc.) over the images in such a way to optimize the viewing experience for the user (e.g., to minimize the extent to which important/desirable portions of the images are obscured). In some embodiments, this process is performed automatically and in a dynamic manner such that the viewing is optimized regardless of the image(s) being rendered. In some embodiments, this process is performed by determining which portions(s) of the image(s) are/include negative space (at least relative to other portions of the images), which are then utilized to display content when the images are rendered.

Figure 4:
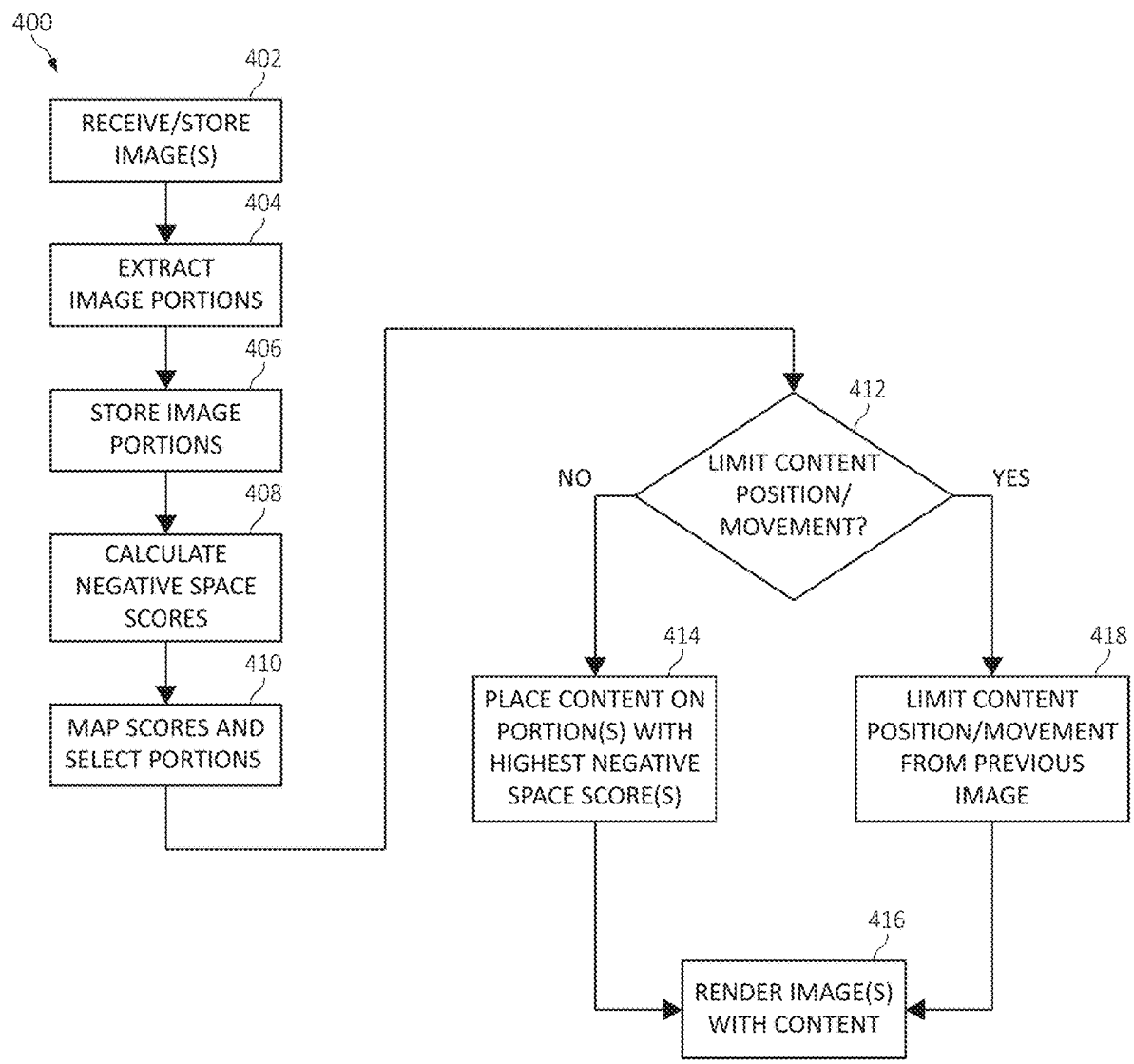
FIG. 4 is a block diagram of a method and/or system for adding content to images according to an embodiment of the present invention.

FIG. 4 illustrates a block diagram of an exemplary method (and/or system) 400 for adding content to images according to some embodiments described herein. It should be understood that the steps depicted in FIG. 4 are merely intended as an example of such a method, as in other embodiments, different steps and/or a different order of the steps may be utilized.

At block 402, the computing system (and/or software application) performing the method 400 receives and stores one or more images, such as a video or video clip that includes multiple video frames or one or more static images. For example, a user may upload the image(s) to the system and/or the system may receive the images from another system (e.g., via the Internet, television broadcast, etc.), which are then stored on any suitable memory device (e.g., a memory in a computing device or "smart" television).

At block 404, image portions are (or one or more image portion is) extracted from the image(s). For example, the system may divide each of the images into multiple portions (or image portions). This process may be performed using tile localization in which the images are "chopped" into smaller images (or tiles). The number (and/or size) of the image portions may be adjustable/configurable. For example, the user may set values (e.g., via a user interface, preferences functionality, etc.) for the number of rows and/or columns of portions/tiles each image is divided into. In some embodiments, if no user input is provided in this regard, a default value may be utilized, which may be automatically set/adjusted based on the size of the images. At block 406, the image portions are stored along with data associated with the images from which they are extracted (e.g., which image, the location of the portion/tile within the image, etc.).

At block 408, a negative space score (or negative space confidence score) is calculated for each of the image portions. The calculated scores may be determined as numerical values (e.g., whole numbers, decimals, positive/negative, etc.) or "grades" (e.g., "high," "low," etc.). The process may include analyzing the image portions utilizing a computer vision technique and/or cognitive analysis. In some embodiments, a machine learning model is utilized, which has been trained to recognize negative space and/or differentiate (or classify) negative space and positive space.

At block 410, the calculated scores for the image portions are mapped to their respective images (and/or locations/positions within the respective images) and at least some of the image portions are selected (e.g., based on the calculated scores). In some embodiments, the image portion(s) with the highest negative spaces score(s) are selected. In other words, the portion(s) of the image(s) that the system determines to have the highest probability of including/being negative space are selected.

In some embodiments, the selected portions are utilized to display content (e.g., captions, advertisements, etc.) as the images are rendered (e.g., the video is played on a computing device, television, etc.). However, in some embodiments, the position and/or perceived movement(s) of the content is limited (e.g., when multiple images are rendered in succession, such as when a video is played). For example, still referring to FIG. 4, at block 412, it is determined whether or not such a limitation is to be implemented, which may be based on whether or not the user has enabled such functionality (e.g., via a preferences functionality, system settings, control panel, etc.).

If such functionality is not enabled, at block 414, the content is placed (or positioned) over (or on) the selected portions of the image(s), and the images are rendered at block 416. That is, regardless of whether or not a particular image is the first in a series of images (e.g., a video) and previous images (e.g., a previous video frame) had similar content added over certain portions thereof, the content is placed on the portion(s) of the image with the highest negative space score(s). As described above, although this may result in the content being displayed on portions of the images that are not "important," the content may be appear to "jump" around when multiple images are rendered in succession (e.g., when a video is being played).

However, if such functionality is enabled, at block 418, the position of content displayed over previous images is taken into consideration (in such instances/if appropriate), which is used to tune/adjust the position of the content by limiting its perceived movement from one image to the next, and at block 416, the image(s) are then rendered with the content appropriately positioned.

For example, if two successive video frames are rendered with captions, and in the first frame, the captions are displayed in the lower, right corner of the frame (and/or display screen), and the system determines that the upper, left corner of the second image has the highest probability of being negative space, rather than display the captions in the upper, left corner of the second frame, the system may select an intermediate position/area of the second frame (e.g., between the lower, right corner and the upper, left corner) to display the captions in order to limit/prevent the captions from "darting" across the display screen between the two video frames. When multiple, successive images are process/analyzed by the system, such as in the case of videos/video frames, this process may be repeated from one image/frame to the next such that, if appropriate, the captions (or other content) will seem to "migrate" or "smoothly" transition across the images/screen (assuming no changes in the negative space of the images that would affect the placement of the content occur).

The extent to which the content (e.g., captions) is prevented from moving from one frame to the next may be based on, for example, the size of the area occupied by the content (e.g., length, width, etc.). For example, in some embodiments, the position of the content is prevented from changing more than a particular percentage of the length and/or width of the size of the area it occupies from one video frame to the next. This maximum allowed movement may be set by the user (e.g., a setting of between 0 and 100 or 0% and 100%).

In some embodiments, the manner in which the content is rendered (e.g., brightness, color, etc.) is adjusted or tuned based on, for example, the color tones, brightness, etc. of the images (or portions of the images) over which the content is displayed (and/or the color, brightness, etc. of the content) to further enhance the viewing experience. This feature may prevent, as one example, white captioning being displayed over light portions of the image(s) (e.g., the color and/or brightness of the captioning may be adjusted to it is visible against the light portions of the image(s)). Also, a functionality may be implemented that allows content (e.g., advertisements, logos, watermarks, etc.) to be "blended in" with the selected portions of the images. For example, if the content includes a logo, the color of a portion of the logo may be adjusted to it blends in with the selected portions of the images (e.g., so that the logo is still visible but not overly distracting). Such features may be implemented by analyzing the portions of the images (and/or the content) using computing vision techniques and/or a cognitive analysis.

Figure 5:
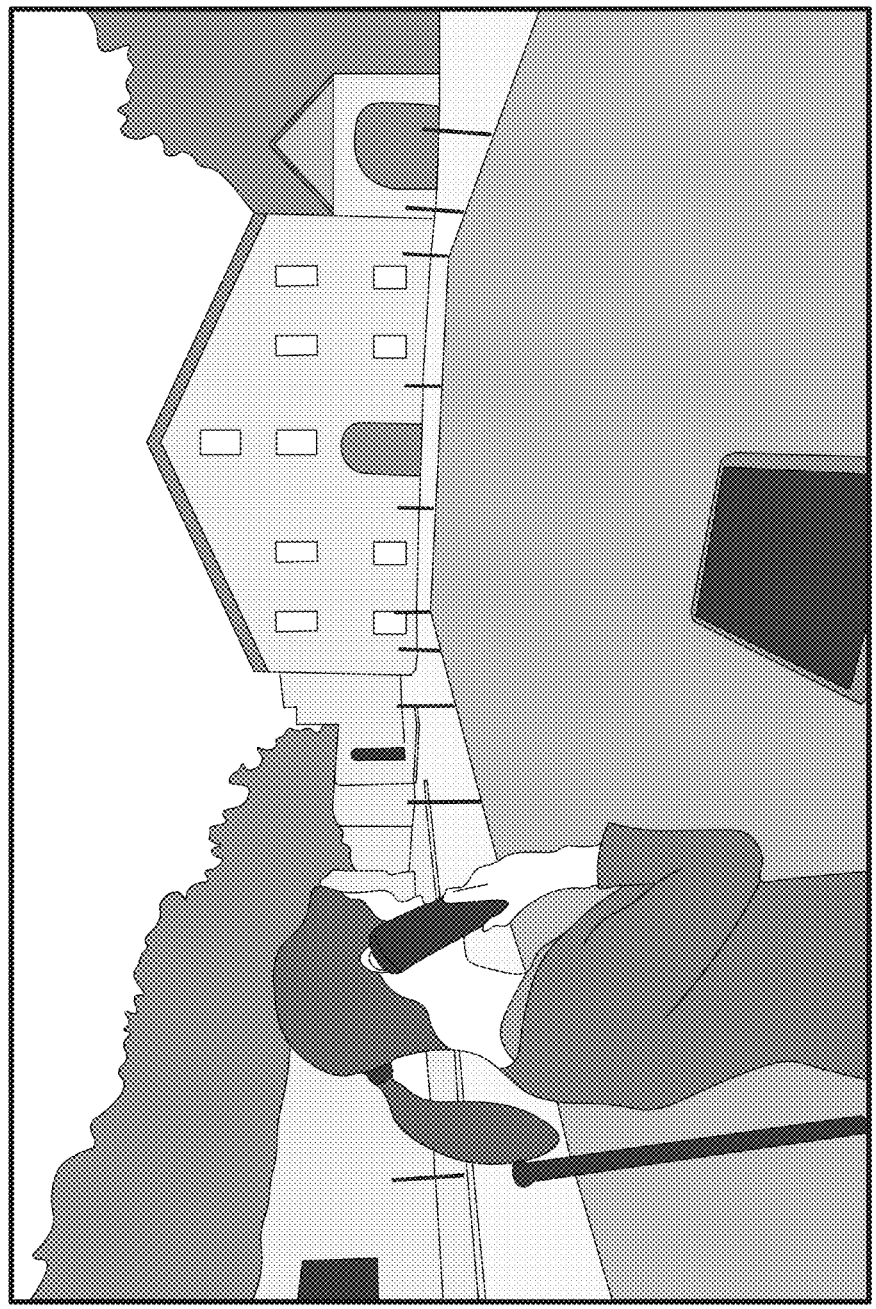
FIG. 5 is a plan view of an exemplary received image according to an embodiment of the present invention.

FIG. 5 illustrates an exemplary image 500 that is received by the system(s) described herein. The image 500 may be, for example, a single frame of a video (e.g., a movie, television show, commercial, etc.) to which captions (or other content) is to be added before the video is rendered or played. In the depicted embodiment, the image 500 shows an individual talking on a phone while standing in front of a historic building, with a lawn or grassy area between, including a plaque on the ground near the individual.

Figure 6:
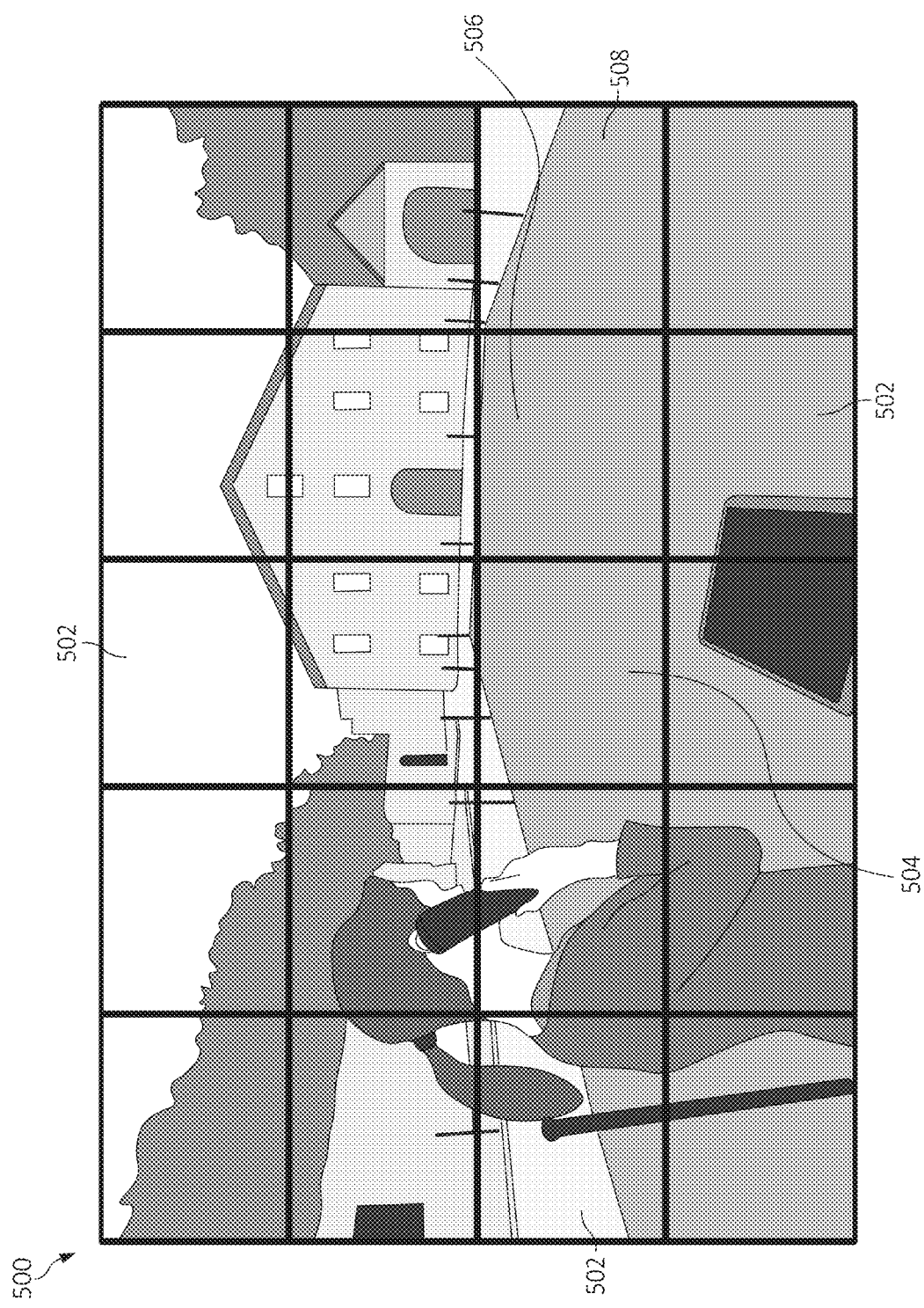
FIG. 6 is a plan view of the image of FIG. 5 divided into multiple portions.

As described above, in some embodiments, the image 500 is divided into multiple portions or image portions, as depicted in FIG. 6. In the example shown, the image 500 is divided into twenty image portions 502, which are of equal size and arranged in a grid-like pattern. It should be understood that in other embodiments the analyzed images may be divided into different numbers of portions, sizes of portions, portions of different shapes, etc. (e.g., based on user preferences).

Still referring to FIG. 6, in some embodiments, a negative space score is calculated for each of the portions 502. In the depicted embodiment, it should be assumed that portions 504, 506, and 508 (i.e., particular ones of the portions 502 that correspond to portions of the lawn/grass in the image 500) have been determined to have the highest negative space scores and/or be the most likely to include/be negative space (although in the particular image shown, the portions of the image 500 that correspond to the sky above the building may also be determined to have high negative spaces scores and/or be appropriate for displaying content).

Figure 7:
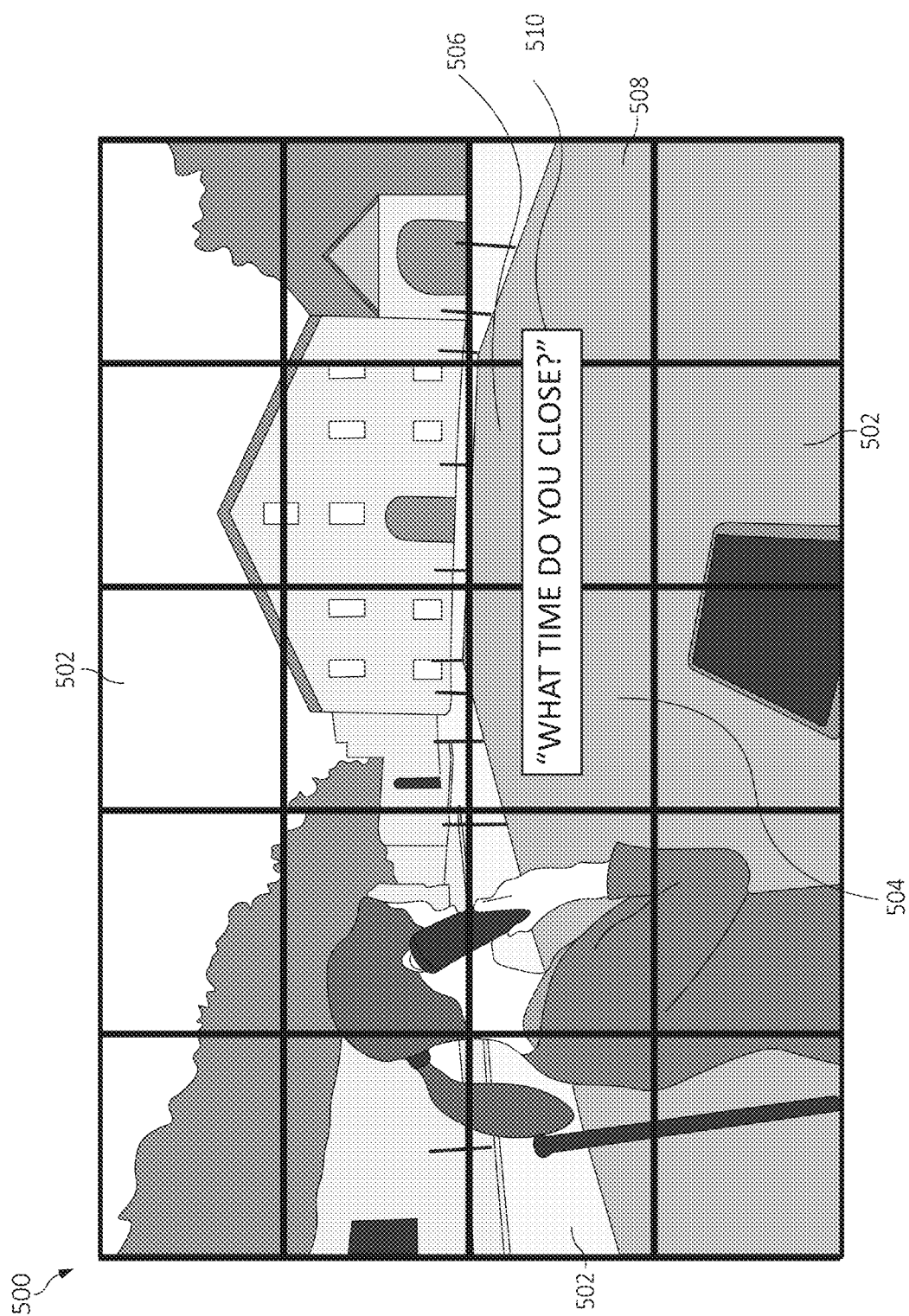
FIG. 7 is a plan view of the image of FIG. 6 with content displayed over selected portions.

As such, when the image 500 is rendered, content 510 is displayed in (or on) portions 504, 506, and 508, as shown in FIG. 7. In the particular example shown, the content 510 includes a caption or caption box (e.g., dialogue including a question, "What time do you close?"). However, as described above, other types of content may be utilized, such as advertisements, logos, etc., or combinations thereof (e.g., a caption combined with an advertisement).

Additionally, in some embodiments, computer vision techniques (e.g., object detection) and/or a cognitive analysis (and/or information associated with the images, such as tags, metadata, etc.) may be utilized to recognize, identify, and/or classify one or more entity (e.g., individuals, locations, objects, etc.) appearing in the images. In such instances, at least some of the content displayed may be selected based on recognized entities (i.e., the content may be associated with the identified entities). For example, in the example shown in FIG. 7, the content may include an advertisement associated with the building/location shown and/or the individual appearing in the foreground.

In such instances, the system may calculate or determine a score (or grade) for a recognized entity (or entities) with respect to how "important" the entity is in/to the image(s) (e.g., an entity importance score). The calculation of the entity importance score may be based on, for example, the prominence of the entity within the image(s), the number of such entities within the image(s), the position of the entity within the image (e.g., whether or not the entity is relatively centered in the image), and/or information associated with the images, such as tags, metadata, etc. For example, if an image is determined to be include one or more of a particular type of animal (e.g., dogs) that occupy 80% of the image (or some other number/percentage over a predetermined threshold), the content may include an advertisement (or some other type of content) associated with the recognized type of animal (or other type of entity). In this way, the entity importance score may be utilized to determine at least some of the content that is displayed. Additionally, the recognition of such entities (and/or the calculated entity importance score) may also be utilized to tune the placement (or position) of the content (e.g., to ensure the content does not block/obscure the entities in the image(s)).

Still referring to FIG. 7, it should be noted that the content 510 is displayed over portions of the image 500 that may be considered to be unimportant to the overall subject matter of the image (i.e., the lawn/grass), as opposed to, for example, being centered, near the bottom edge of the image 500, which would most likely result in the content 510 obscuring the individual and/or the plaque shown in the image 500.

Figure 8:
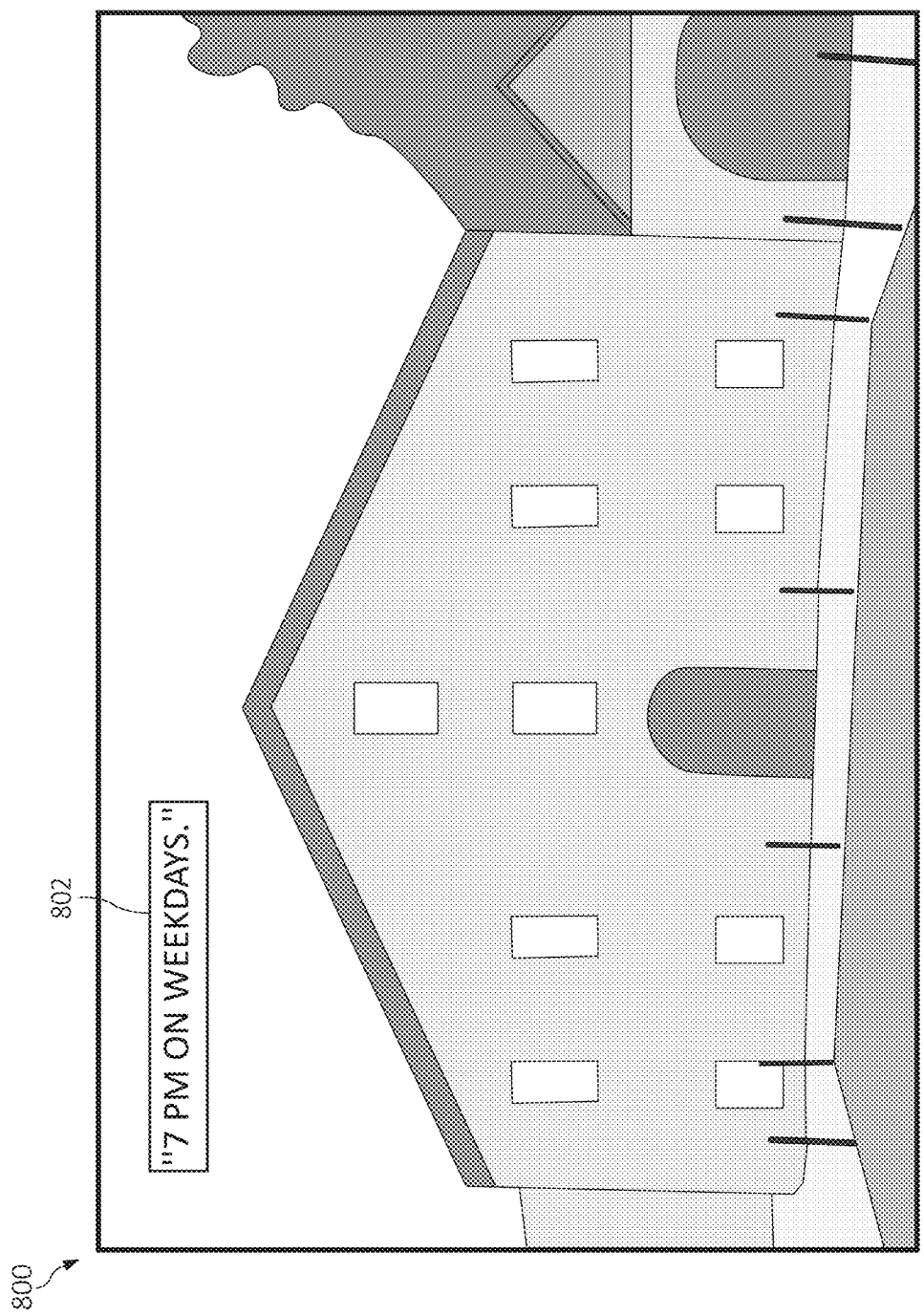
FIG. 8 is a plan view of an exemplary second received image with content displayed over selected portions thereof according to an embodiment of the present invention

Referring now to FIG. 8, a second image 800 is shown. The second image 800 may be considered to include a video frame subsequent to the frame shown in image 500 (FIGS. 5-7). In particular, the second image 800 may include a video frame that appears immediately after the video frame shown in image 500 (e.g., the video may cut from image 500 directly to image 800). Although not shown in detail, the second image 800 may be analyzed/processed in a manner similar to that described above, resulting in content 802 being displayed as shown in FIG. 8 (e.g., on the portions of image 800 that correspond to the sky above the building). In the example shown, the content 802 includes a caption (e.g., "7 PM on weekdays," dialogue that includes a response to the question asked in content 510 in FIG. 7). Although the content 802 is displayed in a portion(s) of image 800 that may be considered to include negative space, it should be noted that the position of content 802 is significantly different than that of content 510 in FIG. 7. In other words, in the depicted embodiment, the content (e.g., caption(s)) has "jumped" a considerable distance across the image(s)/display screen between the two video frames.

Figure 9:
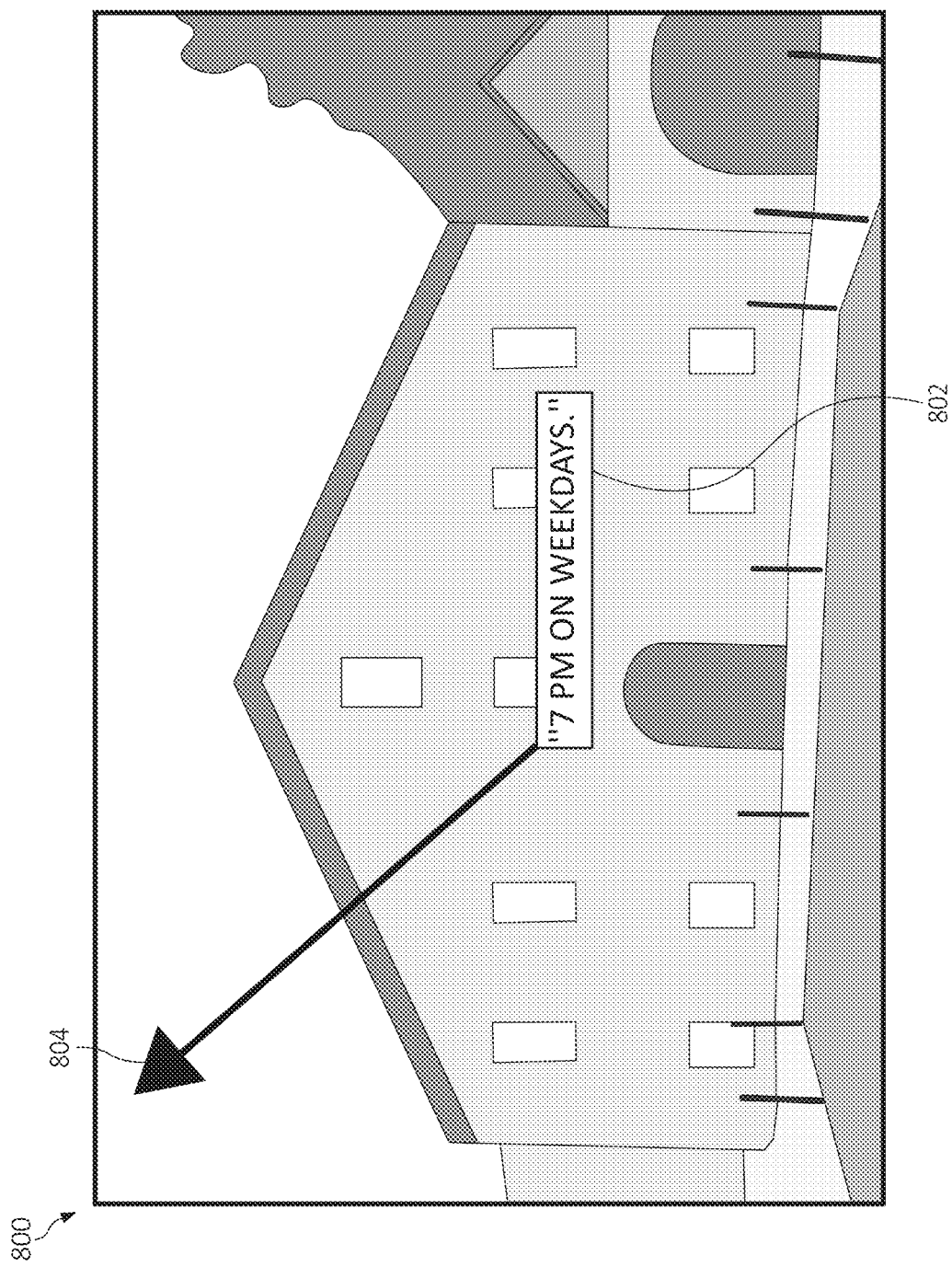
FIG. 9 is a plan view of the image of FIG. 8 with the content displayed in an intermediate position according to an embodiment of the present invention.

In contrast, in the example shown in FIG. 9, the position/movement of content 804 has been limited in a manner similar to that described above. In particular, rather than displaying content 802 in the portions of image 800 that correspond to the sky above the building, the system has displayed the content 802 in an intermediate position between where the content is displayed in FIG. 7 and where it is shown in FIG. 8 (as is evident from comparing FIGS. 7, 8, and 9). That is, the perceived movement of the content 802 has been limited. In some embodiments, if appropriate (e.g., in a video in which the negative space in the frames does not change for a sufficient period), as the video continues to be played, content 802 is "migrated" in direction 804, towards the position shown in FIG. 8 (i.e., over the course of multiple video frames) so that it is eventually displayed over the portion(s) of image 800 with, for example, the highest negative space scores, as described above.

Figure 10:
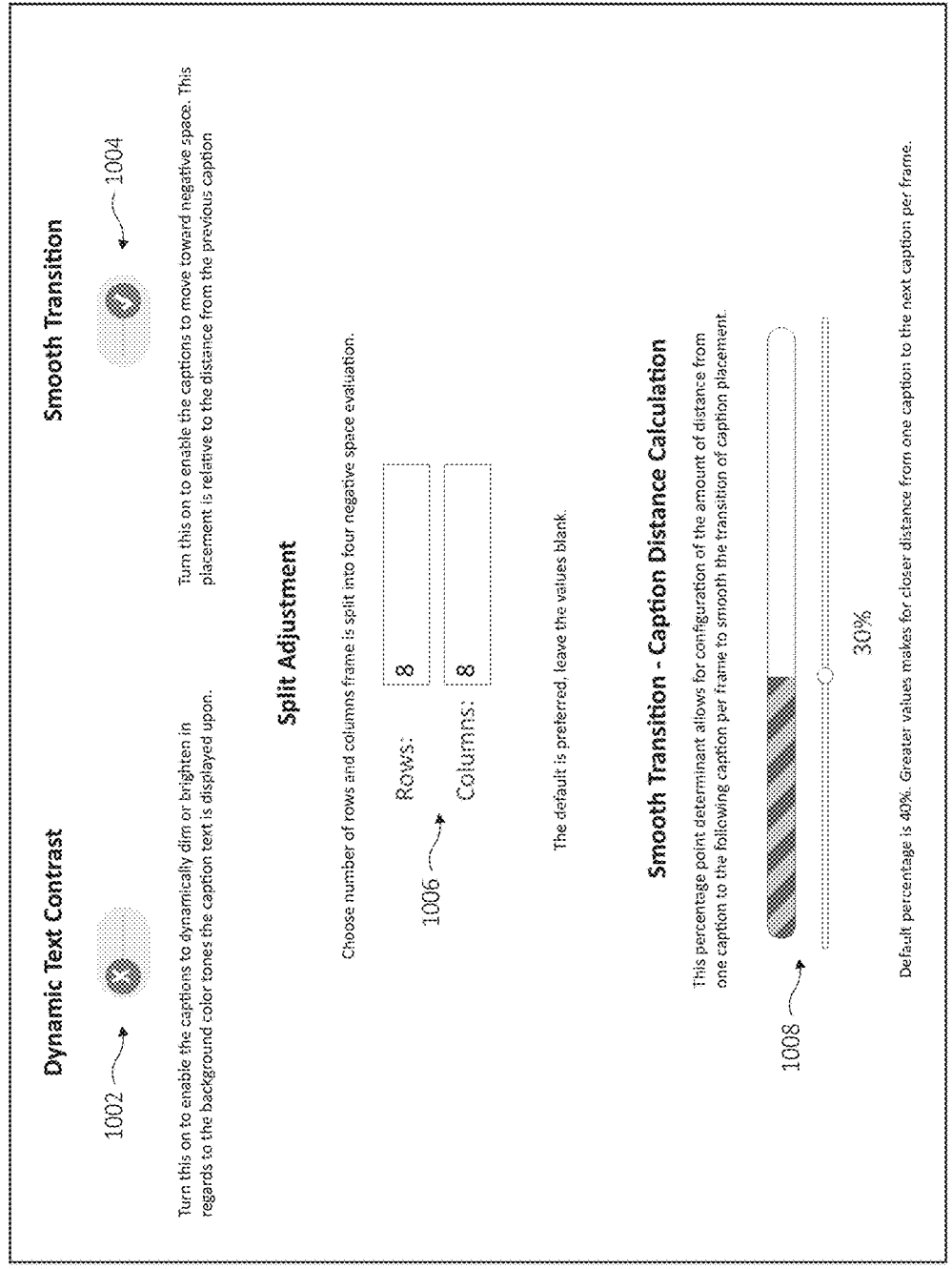
FIG. 10 is a plan view of an exemplary control panel according to an embodiment of the present invention.

Referring now to FIG. 10, an exemplary control panel (or user interface) 1000 is shown. The control panel 1000 may be utilized by a user to adjust/control some of the aspects of functionality described herein. For example, the control panel 1000 may be rendered on a display device (e.g., of a computing device or television) in (or during, part of, etc.) a user preferences or system configuration functionality. In the example shown, the control provided is with respect to the displaying of captions (or closed captioning) while videos (e.g., movies, television shows, etc.) are played. However, it should be understood that the control panel 1000 (and/or another, similar control panel) may also be utilized to control the displaying of other types of content, such as advertisements, logos, watermarks, etc., as described above. In the example shown, the control panel 1000 includes a dynamic text contrast control 1002, a smooth transition control 1004, a split adjustment control 1006, and a smooth transition —caption distance calculation control 1008.

The dynamic text contrast control 1002 may be utilized (e.g., via a "button" or binary "slider") to enable/disable the dynamic dimming/brightening (and/or changes to color) of captions to ensure the captions are visible to the viewer given different color tones (or brightness levels) of the utilized negative space portion(s) of the image(s), as described above. The smooth transition control 1004 may be utilized (e.g., via a button binary slider) to enable/disable the limiting of the positions/movements of captions with respect to their position on previously rendered images (e.g., to prevent/limit caption jumping/darting), as described above.

The split adjustment control 1006 may be utilized (e.g., via text/number boxes for rows and columns) to set/adjust the number (and/or size) of the image portions into which the system divides each image for the negative space calculations, as described above. For example, as the number of rows/columns is increased, the number of image portions may similarly increase (and/or each image portion may be reduced in size). The smooth transition —caption distance calculation control 1008 may be utilized (e.g., via a slider) to set/adjust the extent to which the caption (or other content) is limited in movement from one image (or frame) to the next). For example, as this value is increased, the distance between the positions of the caption box from one image to the next may be reduced (i.e., assuming the negative space of the image(s) has changed such that repositioning the caption is appropriate).

Figure 11:
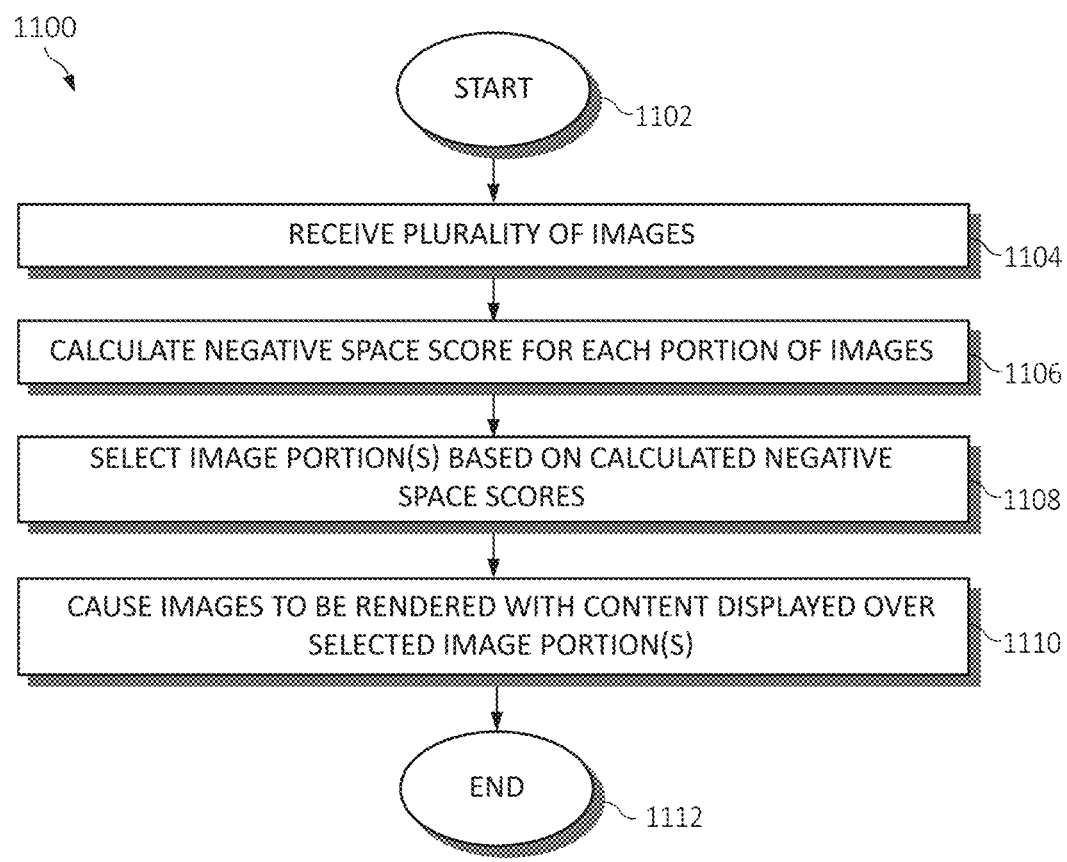
FIG. 11 is a flowchart diagram of an exemplary method for adding content to images according to an embodiment of the present invention.

Turning to FIG. 11, a flowchart diagram of an exemplary method 1100 for adding content to images provided. The method 1100 begins (step 1102) with, for example, a system (and/or software application) such as described above being implemented within one or more devices, such as a computing device, smart television, etc.

A plurality of images are (or at least one images is) received (step 1104). Each of the plurality of images may include and/or be divided into a plurality of image portions. The plurality of images may include a plurality of video frames.

A negative space score is calculated for each of the plurality of image portions (step 1106). The calculating of the negative space score for each of the plurality of image portions may be performed utilizing a cognitive analysis (and/or computer vision technique), as described above.

At least some of the plurality of image portions are selected to display content based on the calculated negative space scores (step 1108). The content may include, for example, at least one of captions associated with the plurality of images and an advertisement.

The plurality of images are caused to be rendered with the content displayed over the selected at least some of the plurality of image portions (step 1110). The causing of the plurality of images to be rendered may include causing a first of the plurality of images to be rendered with the content displayed over a first of the plurality of image portions, and after the rendering of the first of the plurality of images, causing a second of the plurality of images to be rendered with the content displayed over a second of the plurality of image portions. A distance between a position of the content on the first of the plurality of images and a position of the content on the second of the plurality of images may be limited, as described above.

In some embodiments, a color tone (and/or brightness) of the selected at least some of the plurality of image portions (and/or the content) may be analyzed. At least one of a brightness and a color of the content may be adjusted based on the analyzing of the color tone of the selected at least some of the plurality of image portions.

Method 1100 ends (step 1112) with, for example, the completion of the rendering of the plurality of images. The user may then provide input (or feedback) with respect to the displaying of the content, which may be utilized to improve the performance of the system over time. The feedback may be explicit (e.g., received via adjustments made to the settings) or implicit (e.g., detected by monitoring the user and/or communications associated with the user).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for adding content to images comprising:
receiving a plurality of images, wherein each of the plurality of images comprises a plurality of image portions;
calculating a negative space score for each of the plurality of image portions, the negative space score indicative of identified negative space within each of the plurality of image portions, wherein the negative space is representative of empty space within sub-portions of each of the plurality of image portions around which a primary subject of the plurality of image portions does not occupy when rendered;
selecting at least some of the plurality of image portions to display content based on said calculated negative space scores; and
causing the plurality of images to be rendered with the content displayed over said selected at least some of the plurality of image portions.

2. The method of claim 1, wherein the plurality of images includes a plurality of video frames.

3. The method of claim 1, wherein the causing of the plurality of images to be rendered includes:
causing a first of the plurality of images to be rendered with the content displayed over a first of the plurality of image portions; and
after the rendering of the first of the plurality of images, causing a second of the plurality of images to be rendered with the content displayed over a second of the plurality of image portions.

4. The method of claim 3, further comprising limiting a distance between a position of the content on the first of the plurality of images and a position of the content on the second of the plurality of images.

5. The method of claim 1, wherein the content includes at least one of captions associated with the plurality of images and an advertisement associated with the plurality of images.

6. The method of claim 1, further comprising:
analyzing a color tone of said selected at least some of the plurality of image portions; and
adjusting at least one of a brightness and a color of the content based on the analyzing of the color tone of said selected at least some of the plurality of image portions.

7. The method of claim 1, wherein the calculating of the negative space score for each of the plurality of image portions is performed utilizing a cognitive analysis.

8. A system for adding content to images comprising:
a processor executing instructions stored in a memory device, wherein the processor:
receives a plurality of images, wherein each of the plurality of images comprises a plurality of image portions;
calculates a negative space score for each of the plurality of image portions, the negative space score indicative of identified negative space within each of the plurality of image portions, wherein the negative space is representative of empty space within sub-portions of each of the plurality of image portions around which a primary subject of the plurality of image portions does not occupy when rendered;

selects at least some of the plurality of image portions to display content based on said calculated negative space scores; and causes the plurality of images to be rendered with the content displayed over said selected at least some of the plurality of image portions.

9. The system of claim 8, wherein the plurality of images includes a plurality of video frames.

10. The system of claim 8, wherein the causing of the plurality of images to be rendered includes:

causing a first of the plurality of images to be rendered with the content displayed over a first of the plurality of image portions; and after the rendering of the first of the plurality of images, causing a second of the plurality of images to be rendered with the content displayed over a second of the plurality of image portions.

11. The system of claim 10, wherein the processor further limits a distance between a position of the content on the first of the plurality of images and a position of the content on the second of the plurality of images.

12. The system of claim 8, wherein the content includes at least one of captions associated with the plurality of images and an advertisement associated with the plurality of images.

13. The system of claim 8, wherein the processor further:

analyzes a color tone of said selected at least some of the plurality of image portions; and adjusts at least one of a brightness and a color of the content based on the analyzing of the color tone of said selected at least some of the plurality of image portions.

14. The system of claim 8, wherein the calculating of the negative space score for each of the plurality of image portions is performed utilizing a cognitive analysis.

15. A computer program product for adding content to images, by a processor, the computer program product embodied on a non-transitory computer-readable storage medium having computer-readable program code portions stored therein, the computer-readable program code portions comprising:

an executable portion that receives a plurality of images, wherein each of the plurality of images comprises a plurality of image portions;

an executable portion that calculates a negative space score for each of the plurality of image portions, the negative space score indicative of identified negative space within each of the plurality of image portions, wherein the negative space is representative of empty space within sub-portions of each of the plurality of image portions around which a primary subject of the plurality of image portions does not occupy when rendered;

an executable portion that selects at least some of the plurality of image portions to display content based on said calculated negative space scores; and an executable portion that causes the plurality of images to be rendered with the content displayed over said selected at least some of the plurality of image portions.

16. The computer program product of claim 15, wherein the plurality of images includes a plurality of video frames.

17. The computer program product of claim 15, wherein the causing of the plurality of images to be rendered includes:

causing a first of the plurality of images to be rendered with the content displayed over a first of the plurality of image portions; and after the rendering of the first of the plurality of images, causing a second of the plurality of images to be rendered with the content displayed over a second of the plurality of image portions.

18. The computer program product of claim 17, wherein the computer-readable program code portions further include an executable portion that limits a distance between a position of the content on the first of the plurality of images and a position of the content on the second of the plurality of images.

19. The computer program product of claim 15, wherein the content includes at least one of captions associated with the plurality of images and an advertisement associated with the plurality of images.

20. The computer program product of claim 15, wherein the computer-readable program code portions further include:

an executable portion that analyzes a color tone of said selected at least some of the plurality of image portions; and an executable portion that adjusts at least one of a brightness and a color of the content based on the analyzing of the color tone of said selected at least some of the plurality of image portions.

21. The computer program product of claim 15, wherein the calculating of the negative space score for each of the plurality of image portions is performed utilizing a cognitive analysis.

* * * * *